Patented Nov. 4, 1941

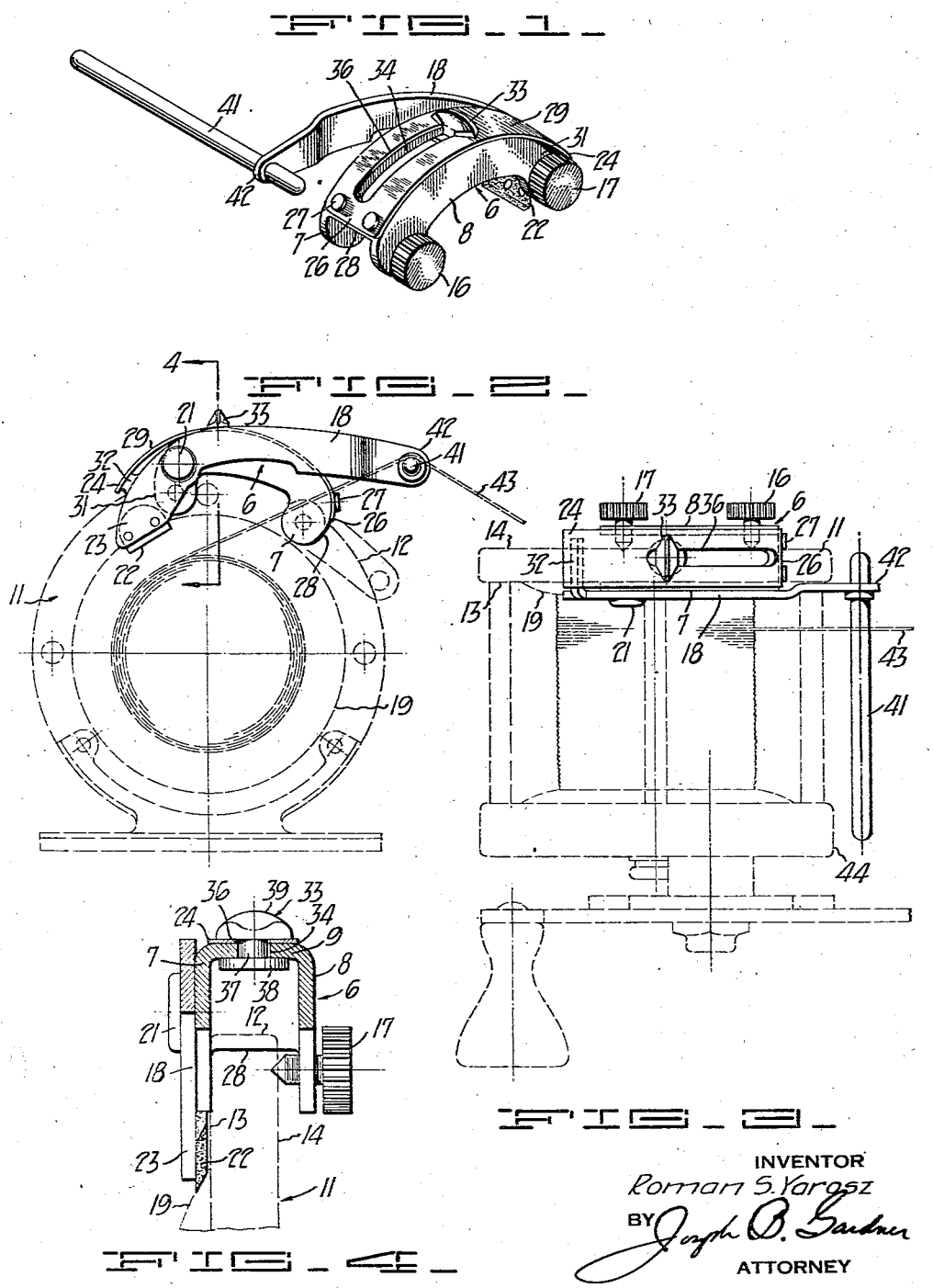

2,261,610

UNITED STATES PATENT OFFICE 2,261,610

FISHING REEL ATTACHMENT

Roman S. Yarosz, Oakland, Calif.

Application April 21, 1939, Serial No. 269,221

9 Claims. (Cl. 242—84.5)

The invention relates to fishing reels and more particularly to that type of fishing reel which is provided with a brake or the like which is automatically set and released by the action of the fishing line for preventing an overrunning of the reel in casting, etc.

Various constructions have been suggested and used in fishing reels for controlling the operation of the reel spool in accordance with the slack or tautness in the fishing line, so as to prevent an over-running of the reel in casting and to obviate back-lash and the like in paying out or reeling in the line. These devices generally include some form of brake mechanism which is engageable with the reel spool and through which the fishing line is fed, so that the tension of the fishing line may be used to control the operation of the brake. Thus for example during casting, when the fishing line is relatively taut, the brake mechanism will release the spool for free rotation, thereby insuring a maximum length of cast, and on the other hand as soon as the lure or casting plug strikes the water and the tension is released on the line, the brake will be immediately and automatically set to prevent an over- running of the reel. Heretofore such devices have been generally built into the reel as an integral part of the construction thereof and have in the main required relatively complicated mechanisms for accomplishing their purpose. In accordance with the present invention and as a principal object thereof, I have provided a mechanism of the character described which is constructed in the form of an attachment which may be applied to a standard type fishing reel and wherein all of the operating parts of the mechanism are unitarily mounted and supported for attachment and removal as a unit from the fishing reel.

Another object of the invention is to provide a device of the character above which is designed for positioning on the reel in such a manner that the same will not present any obstruction to the normal use of the reel and rod nor with the use of other usual pieces of equipment added to the reel.

A further object of the invention is to provide a device of the character described wherein all of the operating mechanism and associated parts are designed and arranged for positioning in a neat, compact manner on one of the end walls of the reel.

Still another object of the invention is to provide a device of the character above described wherein the operating parts are reduced to a minimum number and designed and constructed for insuring a substantially unlimited life of the device.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of a fishing reel attachment constructed in accordance with the present invention.

Figure 2 is an end elevation of the attachment operatively applied to a fishing reel.

Figure 3 is a plan view of the attachment operatively applied to a fishing reel.

Figure 4 is a vertical sectional view of the attachment taken substantially on the plane of line 4—4 of Figure 2.

The device of the present invention consists briefly in a single unitary mechanism which is adapted for detachable connection to one of the end walls of a fishing reel and which is provided with a member mounted for movement to and from a position engaged against the rim of the reel spool to act as a brake thereagainst. Resilient means is embodied in the mechanism for normally urging the member to said position, and the member is provided with means engageable with the fishing line for displacement of said member from said position in a taut position of the line.

Referring more particularly to the accompanying drawing, the device is here unitarily associated on a clamp support 6 which is preferably of U-shaped construction in cross section, as illustrated in Figure 4, and formed with opposed side portions 7 and 8 and a connecting end portion 9. The clamp is adapted to be secured to one of the end walls 11 of a fishing reel by placing the clamp in a straddled position over a peripheral edge portion 12 of the reel with the side portions 7 and 8 in juxtaposition to the inner and outer sides 13 and 14 respectively of the reel end wall. Set-screws 16 and 17 may be provided on the side portion 8 of the clamp for bearing against the side 14 of the reel end wall to detachably and firmly affix the clamp in place.

Movably carried by the clamp at the inner side 7 thereof is a member 18, here in the form of a lever, which is adapted for movement radially of the reel axis and in a plane immediately adjacent to the inner side 13 of the reel end wall for engagement with the flared peripheral portion 19 of one of the end walls or rim of the reel spool. As will be understood, the rims of the reel spool are generally flared outwardly adjacent the periphery of the rims so as to protrude inwardly from the inner sides of the reel end walls, and it is with this flared or tapered portion of the rim that the member 18 engages to thereby act as a friction brake against the reel spool. As here shown, the lever 18 is pivoted intermediate its opposite ends by means of a pin 21 to the inner portion 7 of the clamp, so as to position the pivotal axis of the lever substantially parallel to the axis of rotation of the reel spool. In this manner the lever, which is preferably of relatively thin flat metal stock, is arranged neatly and compactly adjacent one of the reel end walls, and the movement of the lever is confined to a plane adjacent such end wall so as to not occupy any substantial space between the reel end walls which is normally taken up by the coiled fishing line. The brake shoe 22 is here attached to one end 23 of the lever for direct engagement with the rim of the reel spool, and it will be noted that the lever end and shoe in their innermost position are disposed at the outermost edge portion of the spool rims, whereby the line capacity of the spool is not impaired.

Resilient means 24, here in the form of a flat elongated spring, is provided for normally urging the lever to a rotated position engaging the brake shoe with the spool rim. In the present construction the spring 24 is secured adjacent one end 26 thereof, as by means of rivets 27, to the outer end portion 9 of the clamp adjacent one end 28 thereof and substantially overlies such portion of the clamp with the free end 29 of the spring spaced somewhat beyond the adjacent end 31 of the clamp. The free end of the spring is engaged with a transverse arm portion 32 on the lever intermediate the pin 21 and the end 23 of the lever, so as to normally urge the latter end radially into the interior of the reel. Preferably, the clamp itself is curved in longitudinal cross-section so as to generally conform to the curvature of the circular end wall of the reel on which the same is placed, and in accordance with this arrangement the outer end portion 9 of the clamp is convexly curved. Preferably, the spring 24 is similarly curved in longitudinal cross-section so as to closely conform to the shape of the clamp and particularly the free end portion 29 of the spring is terminated substantially immediately adjacent to the periphery of the end wall, so that the clamp and spring arrangement provide a neat and compact arrangement on the reel.

Preferably, some means is provided for controlling the resilience of the spring and as here shown, such means is embodied in the form of a longitudinal slide 33 which engages the end portion 9 of the clamp and the spring, and is slidable longitudinally of the spring so as to regulate the resilient length of the spring. As here shown, the clamp portion 9 and the spring are provided with aligned elongated slots 34 and 36, through which a shank portion 37 of the means 33 is mounted and enlargements 38 and 39 are provided at the opposite ends of the shank for slidably engaging the under-side of the end portion 9 and the top side of the spring respectively.

In this manner, the means 33 functions as a slidable bearing between the spring and the clamp end portion for controlling the resilient length of the spring. Preferably, the slide means 33 and the associated mechanism are arranged centrally of the spring width so as to provide a balanced construction.

Means for rocking the lever to and from an engaged position with the reel spool in accordance with the slack or tautness of the fishing line, is here provided in the form of an arm 41 extending transversely from an opposite end 42 of the lever and over which the fishing line 43 is positioned. The arm 41 preferably extends substantially completely across the interior of the reel so as to engage the fishing line at all widthwise positions thereof and is normally held spaced from the periphery of the reel end wall 11 and the opposite reel end wall 44 by means of the spring 24. In mounting of the device on the reel, the arm 41 is positioned adjacent the top of the reel so that the fishing line is drawn over the arm and down through one of the guides or eyes of the fishing rod. Accordingly, when the line is taut, the arm 41 will be drawn downwardly to thereby rock the lever to raise the brake shoe 22 from the rim of the reel spool. Preferably, the construction is such that in the lowered position of the arm the same will rest directly on the periphery of the reel end walls, so that all strain on the pivotal connection of the arm and associated mechanism is obviated.

In the operation of the device, the brake shoe is normally held against the reel spool to prevent free rotation thereof. During the operations of the reel when the line is normally taut, as for example in casting, the tautness of the line automatically operates to release the brake mechanism so as to provide a free running spool, insuring a maximum length of cast, and at the instant the casting plug or lure strikes the water and the tension on the line is released, the brake is automatically set to prevent an over-running of the reel and an attendant snarling up of the fishing line. It will now be clear that the mechanism of the present invention provides a simple, compact device for accomplishing this purpose and one which may be quickly and readily attached to and removed from a fishing reel.

I claim:

1. A fishing reel attachment comprising, a U-shaped clamp adapted for detachable mounting on a peripheral portion of one of the reel end walls, a member movably carried by said clamp so as to be immediately adjacent to the inner side of said wall and movable radially of said reel in a plane substantially parallel to said end wall to and from a position engaging the rim of the reel spool, resilient means on said clamp normally urging said member to said position, and means carried by said member and engageable with the fishing line and displaceable by the latter when relatively taut to remove said member from said position.

2. A fishing reel attachment comprising, a clamp adapted to embrace a peripheral portion of one of the reel end walls, means for detachably securing said clamp in place on said wall, a lever pivotally carried by said clamp for positioning at the inner side of said wall, one end of said lever being disposed for movement to and from an engaged position against one end of the reel spool, resilient means carried by said clamp urging said lever to said position, and means carried by said lever and engageable with the fishing line and displaceable by the latter when relatively taut to disengage said lever from said spool.

3. A fishing reel attachment comprising, a U-shaped clamp member adapted to straddle a peripheral portion of one of the reel end walls, set-screws carried by said member and adapted to bear against said wall to hold the member in place, a lever pivotally carried by said member for positioning at the inner side of said wall, a brake shoe carried at one end of said lever and movable to and from an engaged position against the end of the reel spool, a spring urging said lever to a position engaging said shoe and spool, and means carried by the opposite end of said lever and engageable with the fishing line and displaceable by the line when relatively taut to remove said shoe from said spool.

4. A fishing reel attachment comprising, a clamp formed to detachably embrace a peripheral portion of one of the reel end walls, a member carried by said clamp and movable radially of the reel axis to and from an engaged position with one of the spool end walls, an elongated spring conforming in shape with and carried by said clamp and engageable with said member for normally urging the same to said position, and means carried by said member and engageable with the fishing line and displaceable by the latter when taut to move said member from said position.

5. In combination with a fishing reel having a pair of opposed circular end walls and a rotary spool mounted therebetween wherein the end walls of the spool are flared to protrude inwardly from the inner side of said first walls, a clamp member adapted for attachment to a peripheral portion of one of said first walls and having a curved outer periphery in conformity with and arranged to overlie said peripheral portion, a lever pivotally carried by said member at the inner side of the attached reel end wall and movable radially of the reel axis to and from an engaged position against one of said spool walls, said lever having a curved form convex outwardly of the reel in the same manner as said clamp a spring mounted on and conforming in shape with the outer periphery of said clamp and having a free end portion engaging said lever and normally urging the same to said position, and means carried by said lever for engagement with the fishing line and displaceable by the latter when taut to move the lever from said position.

6. In combination with a fishing reel having a pair of opposed circular end walls and a rotary spool mounted therebetween wherein the end walls of the spool are flared to protrude inwardly from the inner side of said first walls, a clamp member formed for exclusive attachment to and upon a peripheral portion of one of said first walls and having a curved outer periphery conforming with said peripheral portion, a lever pivotally carried by said member at the inner side of the attached reel end wall and movable radially of the reel axis to and from an engaged position against one of said spool walls, a flat spring mounted on the outer periphery of said clamp and having a free end portion engaging said lever and normally urging the same to said position, and means carried by said lever for engagement with the fishing line and displaceable by the latter when taut to move the lever from said position, said spring being of elongated form and curved in length to generally conform to the curvature of the reel end wall and having the free end portion thereof adjacent to the periphery of said end wall.

7. A fishing reel attachment comprising, a clamp adapted for detachable fastening to a peripheral portion of one of the reel end walls, a member carried by said clamp and movable radially of the reel axis to and from an engaged position with one of the spool end walls, a flat elongated spring secured adjacent one end to said clamp and engageable adjacent a free end portion with said member for normally urging the latter to said position, slidable means connecting said clamp and spring for controlling the resilient length of said spring, and means carried by said member engageable with the fishing line and displaceable by the latter when taut to move said member from said position.

8. A fishing reel attachment comprising, a U-shaped clamp having opposed side portions and an end portion and adapted to straddle a peripheral portion of one of the reel end walls, a lever pivotally carried by one of the side portions of said clamp for movement to and from an engaged position with one of the reel spool rims, a flat elongated spring secured adjacent one end thereof to said clamp and overlying said clamp end portion and adapted to engage adjacent its free end with said lever for normally urging the latter to said position, said spring and clamp end portion being formed with aligned elongated slots, slide means mounted in said slots and securing said spring to said end portion in all of its longitudinal positions in said slots for controlling the resilient length of said spring, and means carried by said lever and engageable with the fishing line and arranged to be displaced by the latter when taut to move the lever from said position.

9. A fishing reel attachment comprising, a clamp adapted to engage and embrace a peripheral portion of one of the reel end walls, a lever pivotally carried by said clamp for positioning at the inner side of said wall, one end of said lever being disposed for movement to and from an engaged position against one end of the reel spool, resilient means urging said lever to said position, an arm carried by said lever and extending transversely across said reel end walls and normally held spaced therefrom by said resilient means and engageable with the fishing line and displaceable by the latter when taut to a position engaged against said reel end walls to rock said lever from said first mentioned position.

ROMAN S. YAROSZ.